(12) United States Patent
Koshimae

(10) Patent No.: US 10,397,332 B2
(45) Date of Patent: Aug. 27, 2019

(54) IN-VEHICLE COMMUNICATION SYSTEM

(71) Applicant: TOYOTA JIDOSHA KABUSHIKI KAISHA, Toyota-shi, Aichi-ken (JP)

(72) Inventor: Naoya Koshimae, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 27 days.

(21) Appl. No.: 15/704,779

(22) Filed: Sep. 14, 2017

(65) Prior Publication Data
US 2018/0097887 A1 Apr. 5, 2018

(30) Foreign Application Priority Data
Sep. 30, 2016 (JP) .................. 2016-195102

(51) Int. Cl.
| | | |
|---|---|---|
| *G01R 31/08* | (2006.01) | |
| *H04L 29/08* | (2006.01) | |
| *H04L 12/40* | (2006.01) | |
| *H04L 29/06* | (2006.01) | |
| *B60W 50/00* | (2006.01) | |
| *H04L 12/851* | (2013.01) | |

(52) U.S. Cl.
CPC ........ *H04L 67/12* (2013.01); *H04L 12/40013* (2013.01); *H04L 12/40163* (2013.01); *H04L 67/42* (2013.01); *B60W 2050/009* (2013.01); *H04L 47/24* (2013.01); *H04L 67/2842* (2013.01); *H04L 2012/40215* (2013.01); *H04L 2012/40273* (2013.01)

(58) Field of Classification Search
CPC ........................................ H04L 67/12
See application file for complete search history.

(56) References Cited

U.S. PATENT DOCUMENTS

| | | | | |
|---|---|---|---|---|
| 5,932,851 A | * | 8/1999 | Wang | B66B 1/3415 |
| | | | | 187/247 |
| 2009/0183033 A1 | * | 7/2009 | Ando | H04L 43/0823 |
| | | | | 714/43 |
| 2013/0054127 A1 | * | 2/2013 | Yamashiro | G08G 1/163 |
| | | | | 701/300 |
| 2016/0264071 A1 | * | 9/2016 | Ujiie | B60R 16/023 |
| 2016/0297401 A1 | * | 10/2016 | Haga | B60R 25/307 |
| 2018/0255072 A1 | * | 9/2018 | Takada | H04L 12/40 |

FOREIGN PATENT DOCUMENTS

JP 2003-030134 A 1/2003

* cited by examiner

*Primary Examiner* — Gerald A Smarth
(74) *Attorney, Agent, or Firm* — Hunton Andrews Kurth LLP

(57) ABSTRACT

An in-vehicle communication system includes a plurality of nodes each connected to a first bus and a second bus. The first bus and the second bus each transmits a message with a priority according to the priority. Each of the plurality of nodes is configured to count the number of times that the message is transmitted from an own node to the first bus having lower priority than the message from other node; determine if the number of times of transmission exceeds a predetermined number of times; and transmit the message with the priority to the first bus or the second bus according to the determination.

8 Claims, 7 Drawing Sheets

IN-VEHICLE COMMUNICATION SYSTEM

INCORPORATION BY REFERENCE

The disclosure of Japanese Patent Application No. 2016-195102 filed on Sep. 30, 2016 including the specification, drawings and abstract is incorporated herein by reference in its entirety.

BACKGROUND

1. Technical Field

The disclosure relates to an in-vehicle communication system.

2. Description of Related Art

It has been known that an arbitration unit that causes the transmission of a message having a certain priority to be prioritized over the transmission of any other messages in a special cycle with a ratio determined for every certain priority is provided in an in-vehicle communication system including a bus conforming to a communication protocol that allows the transmission of a message having a relatively high priority to be prioritized over the transmission of a message having a relatively low priority among nodes (see, for example, Japanese Unexamined Patent Application Publication No. 2003-030134).

SUMMARY

In the bus conforming to such a communication protocol, when messages A, each having a relatively high priority, are consecutively transmitted from a certain node N1, the transmission of a message B having a relatively low priority from another node N2 may not be completed for a relatively long time. Such a circumstance leads to the following disadvantages. When a message C having a relatively high priority is on standby subsequent to the message B in the other node N2, even though the priority of the message C is higher than the priority of the message A, the transmission of the message C may not be completed for a relatively long time (due to the fact that the transmission of the message B is not completed). A circumstance in which the transmission of the message C having a relatively high priority is not completed for a relatively long time influences a robust operation of a vehicle system constructed via the in-vehicle communication systemk.

In the related art, since the priority is substantially changed at a special cycle, the robust operation of the vehicle system is impaired due to the message having the relatively low priority. Since the priority is set by a designer in consideration of the robustness of the vehicle system, such a substantial change of the priority influences the robust operation of the vehicle system.

An aspect of the disclosure is to reduce the influence of a message having a relatively low priority on a robust operation of a vehicle system.

An aspect of the disclosure relates to an in-vehicle communication system including a plurality of nodes each connected to a first bus and a second bus. The first bus and the second bus each transmits a message with a priority according to the priority. Each of the plurality of nodes is configured to count the number of times that the message is transmitted from an own node to the first bus having lower priority than the message from other node; determine if the number of times of transmission exceeds a predetermined number of times; and transmit the message with the priority to the first bus or the second bus according to the determination.

According to the aspect of the present disclosure, it is possible to transmit a message (hereinafter, referred to as a "low-priority message") having a relatively low priority to the second bus when the low-priority message is retained as much as the number of times exceeding the predetermined value. With the in-vehicle communication system, it is possible to perform the transmission of a message (hereinafter, referred to as a "high-priority message") having a relatively high priority early in the first bus when the high-priority message is present subsequent to the low-priority message. That is, it is possible to suppress a circumstance in which the transmission of the high-priority message is not completed for a relatively long time due to the low-priority message in the first bus. With the in-vehicle communication system, it is possible to reduce the influence of the low-priority message on the robust operation of the vehicle system.

In the in-vehicle communication system according to the aspect, each of the plurality of nodes may be configured to transmit the message to the second bus when the number of times of transmission is determined to exceed the predetermined number of times.

According to the aspect, since the messages other than the message (the retention message) on which the message transmission process is performed due to the bus change process are also able to be transmitted to the second bus, it is possible to more efficiently increase the amount of information items capable of being exchanged among the nodes in the in-vehicle communication system than in a case where solely the retention message is transmitted to the second bus.

In the in-vehicle communication system according to the aspect, the priorities may be assigned to the each messages, and each of the plurality of nodes may be configured to transmit a plurality of message to the first bus one by one at every predetermined transmission cycle synchronized with the first bus, and configured to count the number of times of transmission for every message.

In the in-vehicle communication system according to the aspect, each of the plurality of nodes may include a first storage for storing the message transmitted to the first bus, and a second storage for storing the message transmitted to the second bus. Each of the plurality of nodes may be configured to copy the message stored in the first storage to the second storage and delete the message stored in the first storage according to the determination. In the in-vehicle communication system according to the aspect, the first bus and the second bus may conform to Controller Area Network (CAN).

With the in-vehicle communication system, a gateway is not needed when a network between different protocols is connected.

In the in-vehicle communication system according to the aspect, in assigning priorities to messages, a message related to vehicle traveling control may be assigned a priority higher than a priority of a message related to control for improving convenience and thermal comfort.

In the in-vehicle communication system according to the aspect, the messages may be transmitted to the first bus and the second bus by using a code string of binary data. Each of the plurality of nodes may be configured to detect a change in potential of the first bus, and determine that the message from the other node is prioritized over the message from the at least one node when the change in the potential of the first bus is different from the code string of the message transmitted from the at least one node.

In the in-vehicle communication system according to the aspect, Each of the plurality of nodes may be configured to determine whether or not a transmission of the message from the at least one node is completed, and set the number of times the message from the other node is prioritized over the message from the at least one node to be zero when the transmission is completed.

In the in-vehicle communication system according to the aspect, a transmission of a message having a relatively high priority may be prioritized over a transmission of a message having a relatively low priority among the nodes in the second bus. Each of the plurality of nodes may be configured to perform a process of transmitting messages to the second bus by using a plurality of messages having different priorities as targets, determine whether or not a message from another node which is a node other than the at least one node among the nodes is prioritized over a message from the at least one node in the second bus for every message, and count the number of times the message from the other node is prioritized over the message from the at least one node in the second bus, and change a bus such that the message is transmitted to the first bus when one message for which the number of times the message from the other node is prioritized over the message from the at least one node exceeds a predetermined value is generated in the second bus.

With the in-vehicle communication system, it is possible to reduce the influence of the message having a relatively low priority on the robust operation of the vehicle system.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment will be described in detail with reference to the accompanying drawings.

Figure 1:
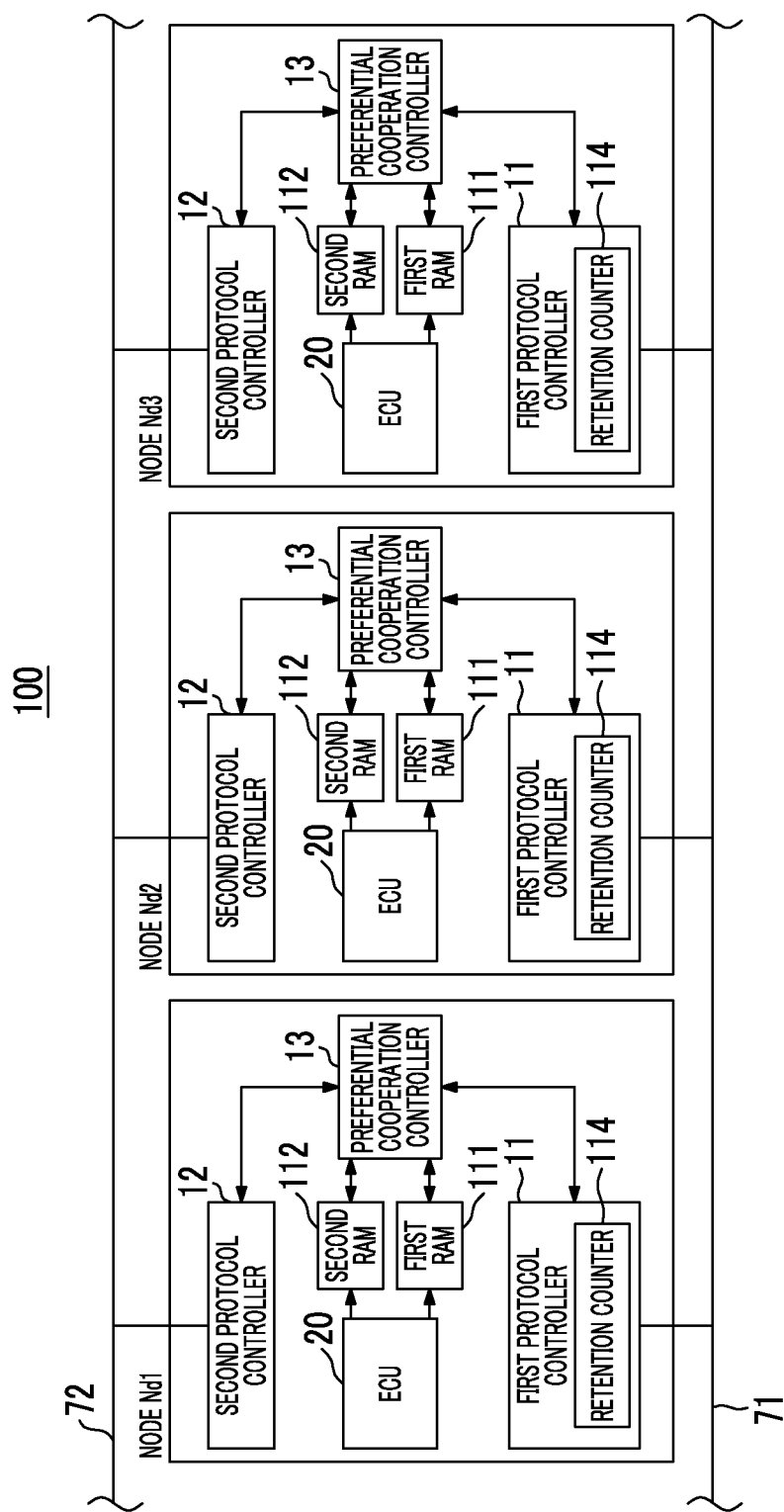
FIG. 1 is a diagram showing an in-vehicle communication system according to an embodiment.

FIG. 1 is a diagram showing an in-vehicle communication system 100 according to an embodiment.

The in-vehicle communication system 100 includes a bus 71 (an example of a first bus), a bus 72 (an example of a second bus), and a plurality of nodes Nd1 to Ndn. The nodes Nd1 to Ndn are connected to the buses 71, 72. Both the buses 71, 72 conform to a communication protocol that allows the transmission of a message having a relatively high priority to be prioritized over the transmission of a relatively low-priority message among the nodes Nd1 to Ndn. In the present embodiment, both the buses 71, 72 conform to Controller Area Network (CAN).

In FIG. 1, three nodes Nd1 to Nd3 among the nodes Nd1 to Ndn are illustrated. The number of nodes n is arbitrarily selected. In FIG. 1, the outline of the internal hardware configurations of the nodes Nd1 to Nd3 is illustrated. In the following description, the nodes Nd1 to Nd3 have the same configuration, and thus, the configuration of the node Nd1 as a representative of the nodes will be appropriately described.

Each of the nodes Nd1 to Ndn includes a first protocol controller 11 (an example of a first transmission processing unit) that performs a process of transmitting messages to the bus 71, a second protocol controller 12 (an example of a second transmission processing unit) that performs a process of transmitting messages to the bus 72, a preferential cooperation controller 13 (an example of a bus change processing unit), a first random-access memory (RAM) 111 (an example of a first storage unit), and a second RAM 112 (an example of a second storage unit).

Each of the first protocol controller 11, the second protocol controller 12, and the preferential cooperation controller 13 may be implemented by an integrated circuit (IC). The first protocol controller 11, the second protocol controller 12, and the preferential cooperation controller 13 may be implemented by one CAN controller (IC). A function of the preferential cooperation controller 13 may be implemented by an Electronic Control Unit (ECU) 20 to be described below (that is, may be implemented by a program executed by a CPU of the ECU 20).

Each of the nodes Nd1 to Ndn further includes the ECU 20. Functions of the ECUs 20 of the nodes Nd1 to Ndn are different from one another. For example, the ECU 20 of each of the nodes Nd1 to Ndn is any one of an ECU that controls a driving device such as an engine, an ECU that controls a braking device, an ECU that controls an air conditioning device, an ECU that controls various pieces of equipment such as door locks, and the like. The ECUs 20 of the nodes Nd1 to Ndn constitute a vehicle system via the in-vehicle communication system 100.

The ECU 20 of any one of the nodes Nd1 to Ndn communicates with the other ECUs 20 through the two buses 71, 72. Specifically, the ECU 20 of each of the nodes Nd1 to Ndn transmits and receives messages through the two buses 71, 72.

In the present embodiment, the message conforms to CAN, and CAN_ID (identification) of the message represents the priority of the message. The CAN_ID of the message is represented by "*h" for the sake of convenience, and * is a number. The lower the number, the higher the priority. Various vehicle information items, various control information items, and the like are included in a data field of the message.

When a dominant ("0") and a recessive ("1") are simultaneously transmitted in the buses 71, 72, the dominant is prioritized over the recessive. Accordingly, a high-priority message is prioritized over a low-priority message. Specifically, the number of the CAN_ID is expressed in the binary numeral system, and the bits are sequentially transmitted to the bus from the most significant bit. A message having a bit "0" among a plurality of messages is prioritized over a message having a bit "1" in the same bit position when the bits of the messages in the respective bit positions are compared with one another in a descending order of bit positions. In the present embodiment, the lower the number of the CAN_ID, the more the position of "0" moves to the left in the binary representation. For example, when the number of the CAN_ID is "9", the binary representation is "1001", and when the number of the CAN_ID is "10", the binary representation is "1010". Thus, the CAN_ID "9" of which a third value from the most significant bit is "0" is prioritized over the CAN_ID "10" of which a third value from the most significant bit is "1".

The priority assigned to each message is determined by a designer of the vehicle system such that robustness needed for the vehicle system is maintained. In general, a relatively high priority is assigned to the message related to vehicle traveling control (traveling, stopping, or turning). For example, the message related to the vehicle traveling control is a message related to braking force control, driving force control, or steering control. Meanwhile, a relatively low priority is assigned to a message related to control (for example, air conditioning control) for improving convenience and thermal comfort.

Hereinafter, the internal configuration (the first protocol controller 11, the second protocol controller 12, the preferential cooperation controller 13, and the like) of the node Nd1 as a representative of the node Nd1 among the nodes Nd1 to Ndn will be described.

The first protocol controller 11 transmits a plurality of messages to the bus 71 one by one. For example, the first protocol controller 11 transmits the message to the bus 71 at every predetermined transmission cycle synchronized with a first clock given in the ECU 20. The first clock is synchronized among the nodes Nd1 to Ndn.

The transmission of the message transmitted to the bus 71 by the first protocol controller 11 may be completed or may not be completed depending on the comparison with priorities of messages from other nodes. The same is true for the message transmitted to the bus 72 by the second protocol controller 12. Accordingly, in the present specification, the expression "the message is transmitted to the bus" and other similar expressions do not mean that "the transmission of the message to the bus is completed".

The messages to be transmitted by the first protocol controller 11 are generated by the ECU 20 of the node Nd1, and are sequentially stacked in the first RAM 111 of the first protocol controller 11. In the present embodiment, the messages to be supplied to the first RAM 111 from the ECU 20 include messages having different priorities. That is, a plurality of messages is sequentially supplied to the first RAM 111 in a state in which messages having relatively high priorities and messages having relatively low priorities are present together. The first protocol controller 11 sequentially transmits one or more messages stacked in the first RAM 111 to the bus 71 one by one according to a queue in the order in which the messages are stacked. The message stacked in the first RAM 111 is cleared (erased) when the transmission of the message is completed. As will be described below, the message within the first RAM 111 may be erased by the preferential cooperation controller 13.

The first protocol controller 11 counts the number of times the messages from the other nodes are prioritized over the message from the own node (the node Nd1 in the present example) in the bus 71 for every message. Thus, the first protocol controller 11 includes a retention counter 114 in the present embodiment.

The first protocol controller 11 determines whether or not the message from the other node is prioritized over the message from the own node at every transmission cycle. When the first protocol controller determines that the message from the other node is prioritized over the message from the own node, the first protocol controller 11 increments the retention counter 114 by "one". The first protocol controller may detect that the message from the other node is prioritized over the message from the own node based on a potential of the bus 71. That is, when a change in potential of the bus 71 is different from a code string of "0" and "1" of the message from the own node, the message from the other node is prioritized over the message from the own node. When the message from the other node is prioritized over the message from the own node, the transmission of the message from the own node is carried over to the next cycle. Hereinafter, a state in which the message from the other node is prioritized over the message from the own node is referred to as "lower-priority determination", and a state in which the message from the own node is prioritized over the messages from the other nodes is referred to as "higher-priority determination". When the message from the own node is prioritized over the messages from the other nodes, the transmission of the message is completed. When the transmission of the message is completed, the retention counter 114 is cleared (that is, a value of the retention counter 114 is reset to be "zero").

The second protocol controller 12 transmits a plurality of messages to the bus 72 one by one. For example, the second protocol controller 12 transmits the messages to the bus 72 at every predetermined transmission cycle synchronized with a second clock given in the ECU 20. The second clock may be the same as the first clock, or may be different from the first clock. The second clock is synchronized among the nodes Nd1 to Ndn. The messages to be transmitted by the second protocol controller 12 are generated by the ECU 20 of the node Nd1, and are sequentially stacked in the second RAM 112 of the second protocol controller 12. As will be described below, a retention message to be described below may be written in the second RAM 112 of the second protocol controller 12 from the preferential cooperation controller 13. The second protocol controller 12 transmits one or more messages stacked in the second RAM 112 to the bus 72 one by one according to a queue in the order in which the messages are stacked. The message stacked in the second RAM 112 is cleared (erased) when the transmission of the message is completed. The first RAM 111 and the second RAM 112 may be constructed by separate storage areas on one RAM, respectively.

In the present embodiment, the messages to be supplied to the second RAM 112 from the ECU 20 are different from the messages to be supplied to the first RAM 111 from the ECU 20. For example, the messages to be supplied to the second RAM 112 from the ECU 20 are for use in a first node different from the own node, and the messages to be supplied to the first RAM 111 from the ECU 20 are for use in a second node different from the first node. Alternatively, the messages to be supplied to the second RAM 112 from the ECU 20 and the messages to be supplied to the first RAM 111 from the ECU 20 are for use in the same other node, and include control information items of different attributes in data fields, respectively. As stated above, the first protocol controller 11 and the second protocol controller 12 perform a process of transmitting the messages to the bus 71 at every transmission cycle synchronized with the first clock by using the messages stacked in the first RAM 111, as targets, and a process of transmitting the messages to the bus 72 at every transmission cycle synchronized with the second clock by using the messages stacked in the second RAM 112, respectively. Accordingly, it is possible to transmit a larger number of messages per unit time to the buses 71, 72 by efficiently using the two buses 71, 72. Since the messages (the messages other than the retention message to be described below) are also able to be transmitted to the bus 72, it is possible to more efficiently increase the amount of information items capable of being transmitted and received among the nodes Nd1 to Ndn in the in-vehicle communication system 100 than in a case where the bus 72 is used as a dedicated bus for the retention message to be described below.

The second protocol controller 12 may have the same counter as the retention counter 114. As one example, it is assumed that the retention counter 114 is provided solely in the first protocol controller 11 in the present embodiment.

The preferential cooperation controller 13 is connected to the first protocol controller 11 and the second protocol controller 12, and is also connected to the first RAM 111 and the second RAM 112.

When a message (hereinafter, referred to as a "retention message") for which the value of the retention counter 114 exceeds a predetermined value Nth is generated, the preferential cooperation controller 13 performs a bus change process. The predetermined value Nth is a value close to an upper limit that is allowable for the number of times of the lower-priority determination, and is a value slightly lower than the upper limit. The predetermined value Nth is an appropriate value determined by the designer of the vehicle system such that robustness needed for the vehicle system is maintained. For example, the predetermined value Nth may be set based on the highest priority among all the messages stacked in the first RAM 111, or may be a value (a predetermined value) set to each node. In the former case, the higher the highest priority of the message among all the messages stacked in the first RAM 111, the lower the predetermined value Nth is set.

The bus change process is a process of transmitting the retention message to the second protocol controller 12 other than the first protocol controller 11. That is, the bus change process is a process of changing a bus as a transmission destination of the retention message from the bus 71 to the bus 72. Specifically, the preferential cooperation controller 13 erases the retention message at the head of the queue of the first RAM 111, and writes the retention message in the second RAM 112. The preferential cooperation controller 13 writes the retention message at the tail of the queue of the second RAM 112, but may change the queue of the second RAM 112 such that the retention message reaches a location other than the tail of the queue of the second RAM 112. When the preferential cooperation controller 13 performs the bus change process, the retention counter 114 is cleared.

With the in-vehicle communication system 100 according to the present embodiment, since the number of times of the lower-priority determination is counted for every message, the lower-priority determination states of the messages may be individually evaluated. Accordingly, the bus change process may be performed based on the lower-priority determination states of the messages.

Specifically, with the in-vehicle communication system 100 according to the present embodiment, the bus change process is performed when the message for which the value of the retention counter 114 exceeds the predetermined value Nth is generated. When the bus change process is performed, the second protocol controller 12 other than the first protocol controller 11 transmits the retention message. Accordingly, the transmission of a message (for example, a message having a relatively high priority) that is on standby subsequent to the retention message to the bus 71 by the first protocol controller 11 is performed early. In other words, when the bus change process is performed, since the bus as the transmission destination of the retention message is changed from the bus 71 to the bus 72, the retention message is erased from the queue of the first RAM 111. Accordingly, the transmission of the message (for example, a message having a relatively high priority) that is on standby subsequent to the retention message is prompted. As a result, it is possible to reduce the influence of the message having a relatively low priority such as the retention message on a robust operation of the vehicle system.

Incidentally, since the bus 71 conforms to CAN, when the dominant ("0") and the recessive ("1") are simultaneously transmitted, the dominant is prioritized over the recessive as stated above, and the bus 71 enters a dominant state. Accordingly, when an abnormality (so-called dominant locking) indicating that the bus 71 is locked in the dominant state occurs, all messages from nodes other than a node in which the dominant locking occurs, among the nodes Nd1 to Ndn, are not able to be transmitted to the bus 71 (that is, all the messages from the nodes other than the node in which the dominant locking occurs are in the lower-priority determination state).

With the in-vehicle communication system 100 according to the present embodiment, even when the dominant locking occurs in the bus 71, since the retention counter 114 and the preferential cooperation controller 13 function similarly, it is possible to reduce a disadvantage caused by the dominant locking. That is, when the dominant locking occurs in the bus 71, the messages within the first RAMs 111 of the nodes other than the node in which the dominant locking occurs may be transmitted to the bus 72.

With the in-vehicle communication system 100 according to the present embodiment, since the above-mentioned advantage is acquired even though the priority of the retention message is not changed, it is possible to avoid a problem (that is, a problem that a relatively strong influence may be exerted on the robust operation of the vehicle system due to the fact that the retention message is prioritized over the message having a relatively high priority in the bus 71) caused when the priority of the retention message is changed. As another problem caused when the priority of the retention message is changed, since the changing of the priority of the retention message leads to a change in the CAN_ID of the retention message, there is a possibility that the retention message will not be received by an intended node in CAN.

Figure 2:
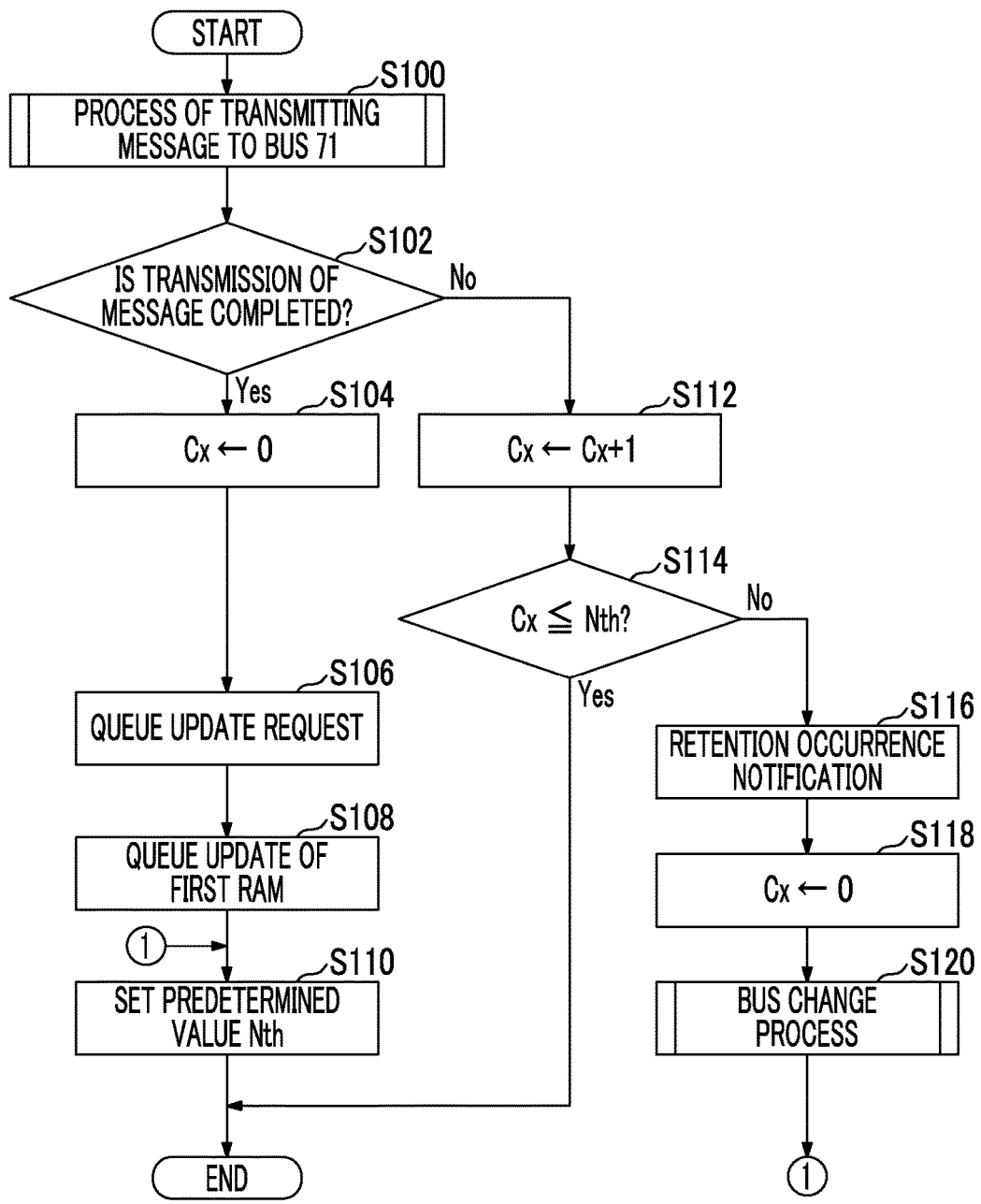
FIG. 2 is a schematic flowchart of processes performed by a preferential cooperation controller.

FIG. 2 is a schematic flowchart of processes performed by the first protocol controller 11 and the preferential cooperation controller 13. In FIG. 2, the processes related to the first protocol controller 11 and the process related to the preferential cooperation controller 13 are described. The processes shown in FIG. 2 are performed at every transmission cycle of the message.

In step S100, the first protocol controller 11 performs the process of transmitting the message to the bus 71. That is, the first protocol controller 11 transmits the message at the head of the queue of the first RAM 111 to the bus 71.

In step S102, the first protocol controller 11 determines whether or not the transmission of the message related to the message transmission process in step S100 is completed. When the determination result is "YES (TRUE)", the process proceeds to step S104, and when the determination result is "NO (FALSE)", the process proceeds to step S112.

In step S104, the first protocol controller 11 clears the retention counter 114. That is, the first protocol controller 11 resets a value Cx of the retention counter 114 to be "zero".

In step S106, the first protocol controller 11 outputs a queue update request for updating the queue of the first RAM 111 to the preferential cooperation controller 13.

In step S108, the preferential cooperation controller 13 erases the message at the head of the queue of the first RAM 111, and updates the queue of the first RAM 111. Accordingly, when the transmission of the message is completed in the present transmission cycle, the message is erased.

In step S110, the preferential cooperation controller 13 sets the predetermined value Nth. When the predetermined value Nth is set, the preferential cooperation controller 13 notifies the first protocol controller 11 of the predetermined set value Nth. When the predetermined value Nth is constant, step S110 is not needed.

In step S112, the first protocol controller 11 increments the value Cx of the retention counter 114 by "one".

In step S114, the first protocol controller 11 determines whether or not the value Cx of the retention counter 114 is equal to or less than the predetermined value Nth. When the determination result is "YES (TRUE)", the process in the present processing cycle is ended, and when the determination result is "NO (FALSE)", the process proceeds to step S116.

In step S116, the first protocol controller 11 outputs a retention occurrence notification for notifying the occurrence of the retention message to the preferential cooperation controller 13.

In step S118, the first protocol controller 11 resets the value Cx of the retention counter 114 to be "zero".

In step S120, the preferential cooperation controller 13 performs the bus change process in response to the retention occurrence notification. The bus change process is as mentioned above. When step S120 is ended, the process proceeds to step S110.

According to the processes shown in FIG. 2, the preferential cooperation controller 13 may perform the bus change process when the value Cx of the retention counter 114 exceeds the predetermined value Nth. Accordingly, it is possible to reduce the influence of the message having a relatively low priority on the robust operation of the vehicle system.

Hereinafter, the advantages of the present embodiment will be described with reference to FIGS. 3 to 7. In the following description, it is assumed that the number of nodes in the in-vehicle communication system is 3 for the sake of convenience in the description.

Initially, the problem of the related art, that is, the influence of the message having a relatively low priority on the robust operation of the vehicle system will be described with reference to FIG. 3 and FIG. 4.

Figure 3:
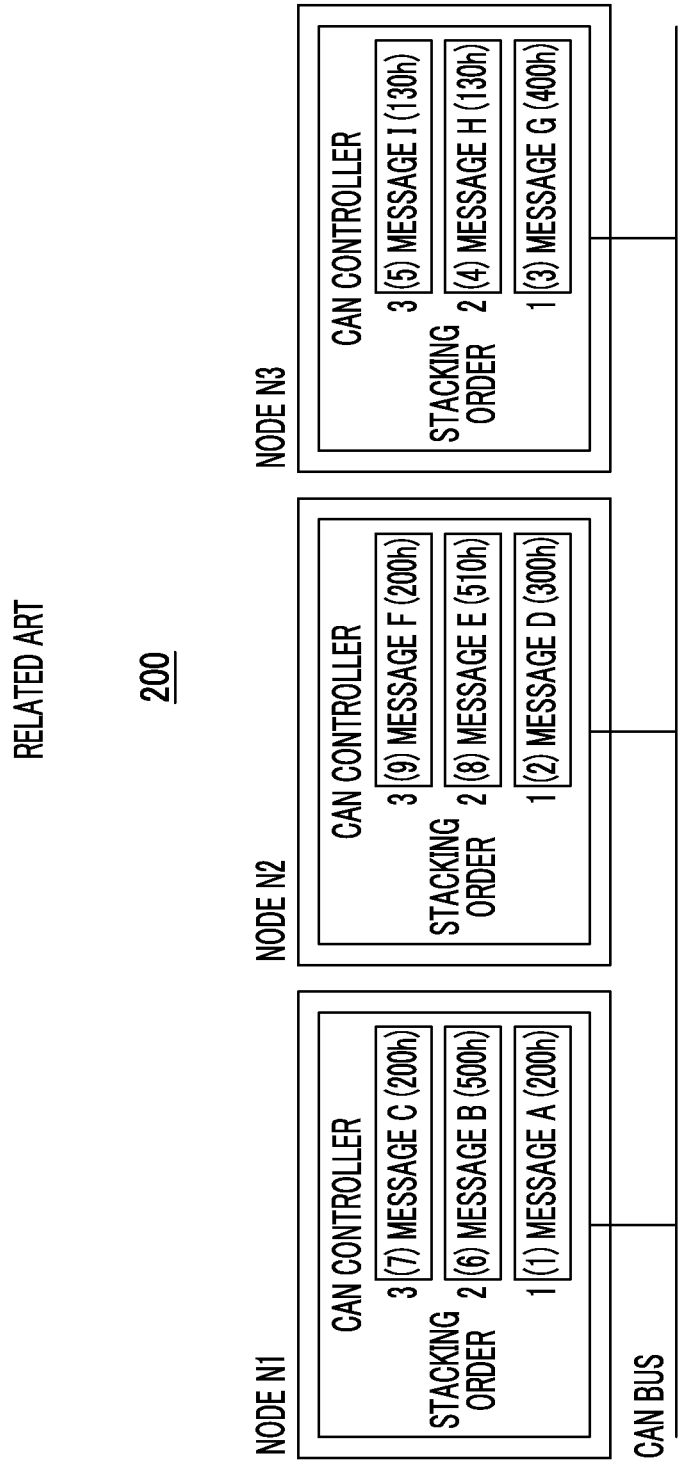
FIG. 3 is a diagram showing an in-vehicle communication system according to the related art.
Figure 4:
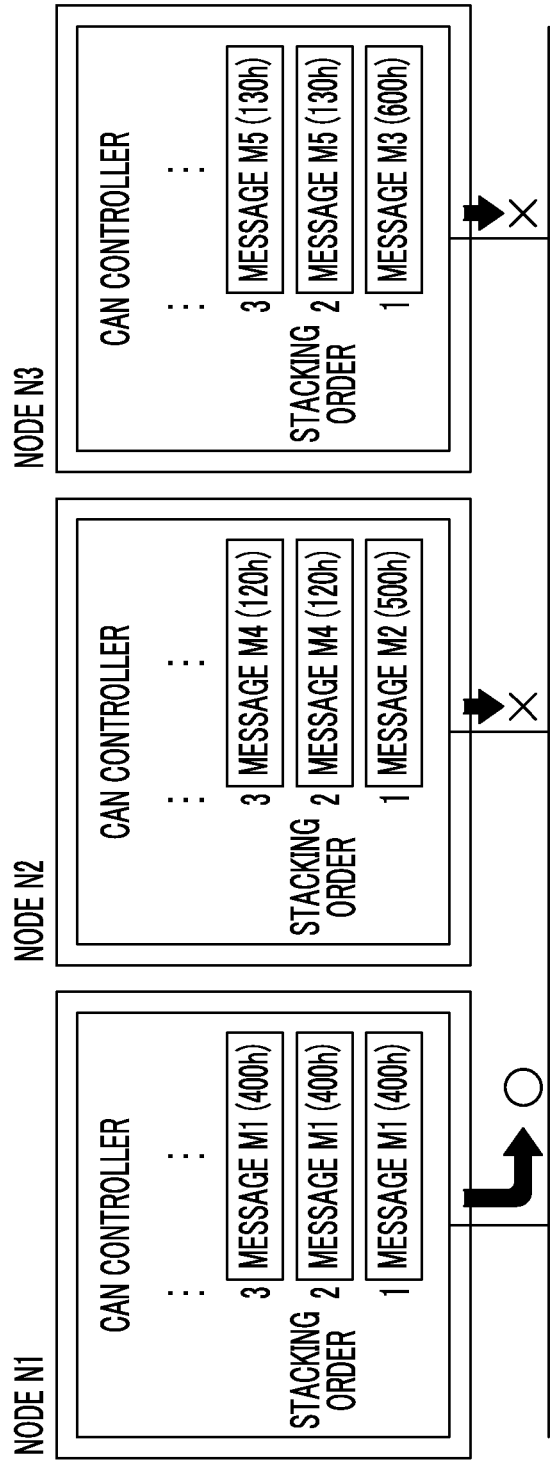
FIG. 4 is a diagram showing the in-vehicle communication system according to the related art.

FIGS. 3 and 4 are diagrams showing an in-vehicle communication system 200 according to the related art. The in-vehicle communication system 200 according to the related art includes one CAN bus, and thus, one CAN controller is provided in each node. Each CAN controller includes the protocol controller and the RAM. In FIGS. 3 and 4, the stacked states of the messages in the RAMs are schematically shown in the blocks of the CAN controllers. In the illustrated stacked state, the bottom is the head of the queue, and first to third messages are shown in each of the nodes N1 to N3 in the present example. Priorities assigned to the messages are depicted in brackets given to the messages.

In the example shown in FIG. 3, the transmission of messages A to I within the nodes N1 to N3 to the CAN bus is completed in an ascending order of numbers of (1) to (9) respectively given to the messages. Specifically, in an initial transmission cycle, a message A having the highest priority among the messages A, D, G at the heads of the nodes N1 to N3 is in the higher-priority determination state, and the transmission of the message A is completed first. As a result, the message B reaches the head of the queue of the node N1. In the next transmission cycle, the message D having the highest priority among the messages B, D, G at the heads of the nodes N1 to N3 is in the higher-priority determination state, and the transmission of the message D is completed second. As a result, the message E reaches the head of the queue of the node N2. In the next transmission cycle, the message G having the highest priority among the messages B, E, G at the heads of the nodes N1 to N3 is in the higher-priority determination state, and the transmission of the message G is completed third. As a result, the message H reaches the head of the queue of the node N3. The same is true for the remaining messages. In the example shown in FIG. 3, the transmission of the messages A to I is completed without being relatively retained.

Meanwhile, in the example shown in FIG. 4, since a plurality of messages M1, each having a priority of $400h$, is consecutively stacked in the node N1 and each has a priority higher than those of messages M2 and M3 at the heads of the nodes N2 and N3, the transmission of the plurality of messages M1 from the node N1 to the CAN bus is consecutively completed. In other words, since the messages M2 and M3 of the nodes N2 and N3 at the heads have relatively low priorities, the messages M2 and M3 are consecutively in the lower-priority determination state against the messages M1, and are retained for a relatively long time. Due to such relatively long-time retention, messages M4 and M5 having relatively high priorities may be retained for a relatively long time in the nodes N2 and N3. In the example shown in FIG. 4, even though the messages M4 and M5 have priorities higher than those of the messages M1, there is a disadvantage that the messages M4 and M5 are not transmitted to the CAN bus for a relatively long time due to the messages M2 and M3. A circumstance in which the transmission of the messages M2 and M3 having relatively low priorities is not completed for a relatively long time may exert a relatively strong influence on the robust operation of the vehicle system constructed via the in-vehicle communication system 200.

In contrast, according to the present embodiment, it is possible to reduce the influence of the message having a relatively low priority on the robust operation of the vehicle system as will be described with reference to FIGS. 5 to 7.

Figure 5:
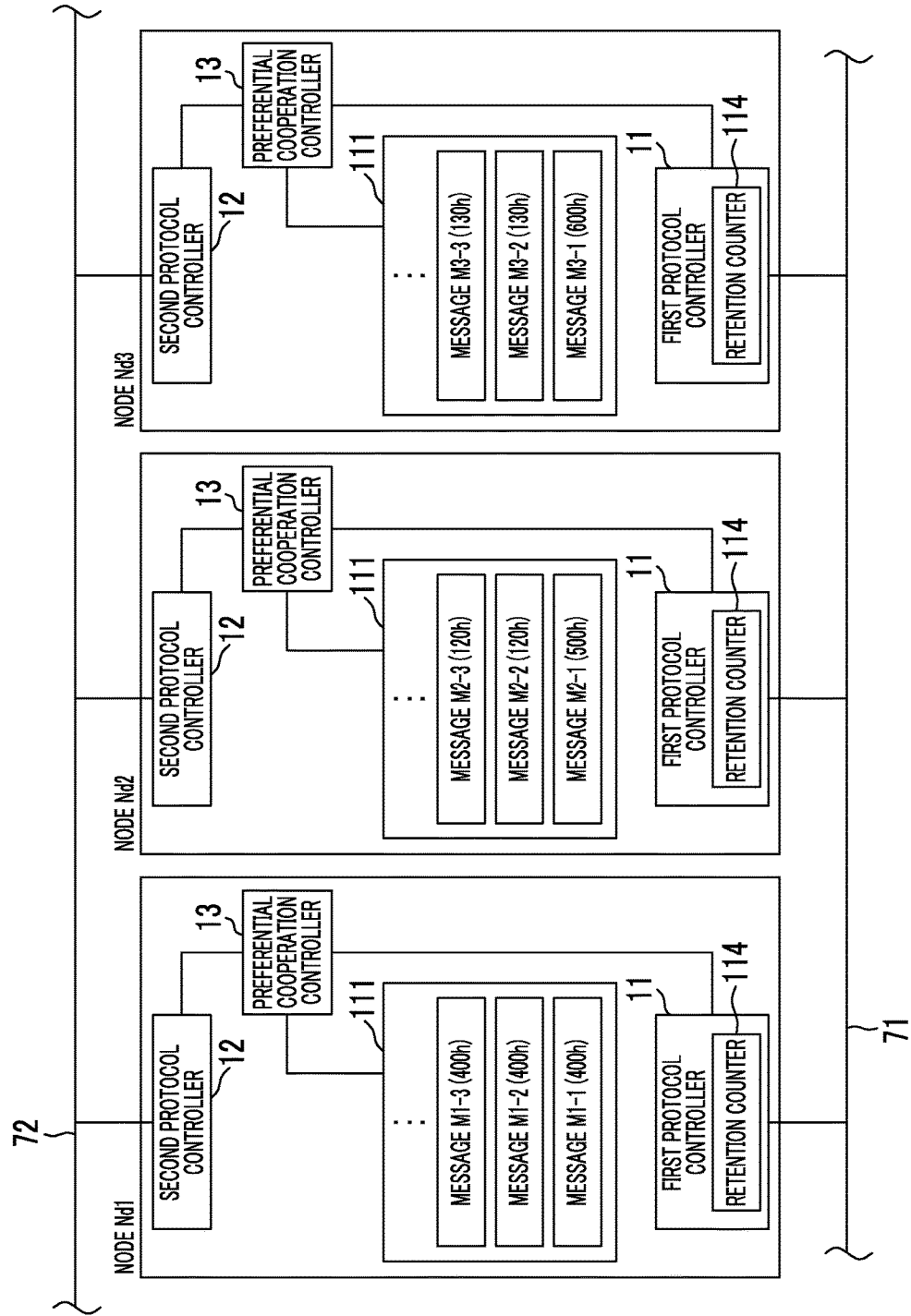
FIG. 5 is an explanatory diagram of an operation example according to the present embodiment.
Figure 6:
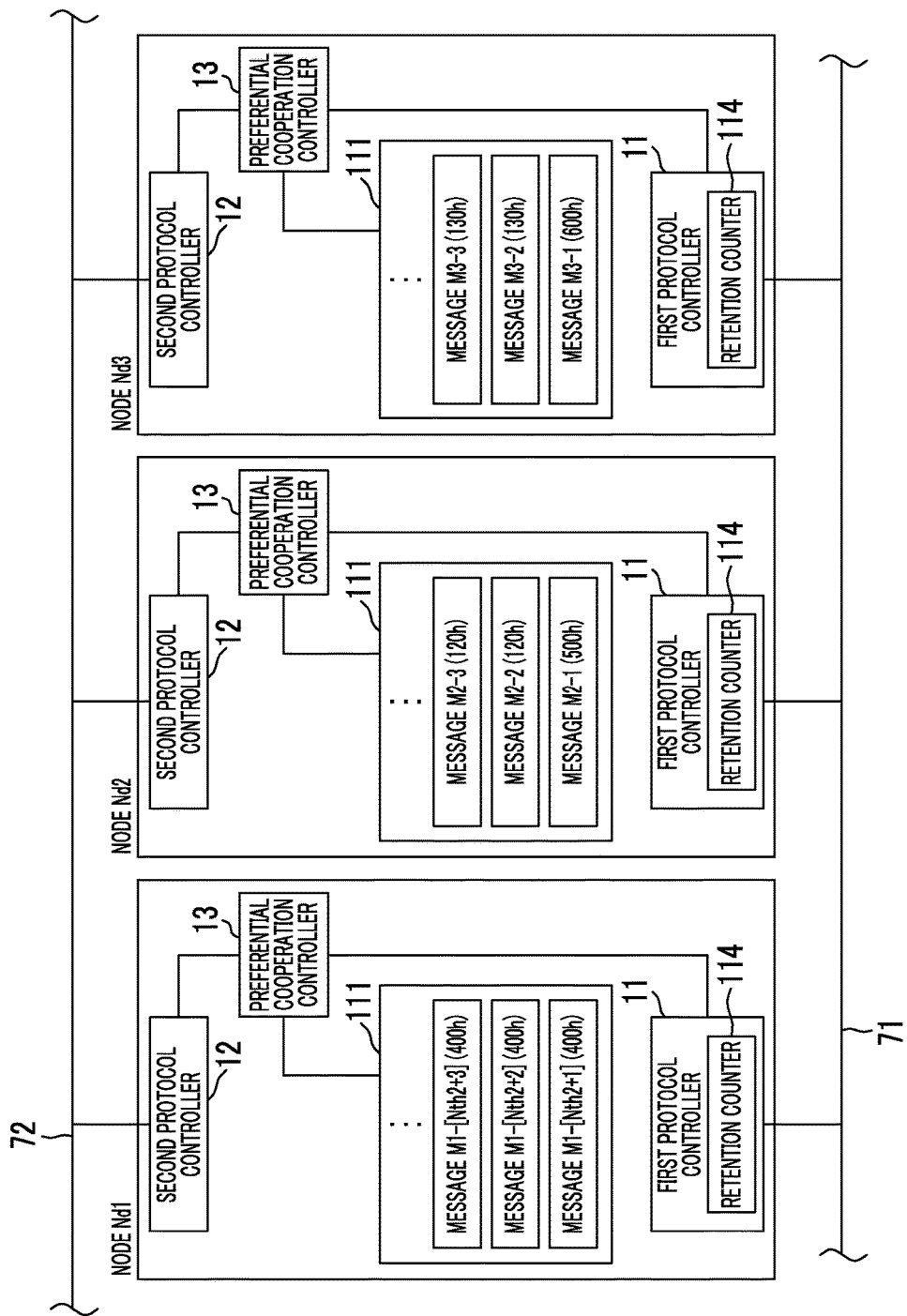
FIG. 6 is an explanatory diagram of the operation example according to the present embodiment.
Figure 7:
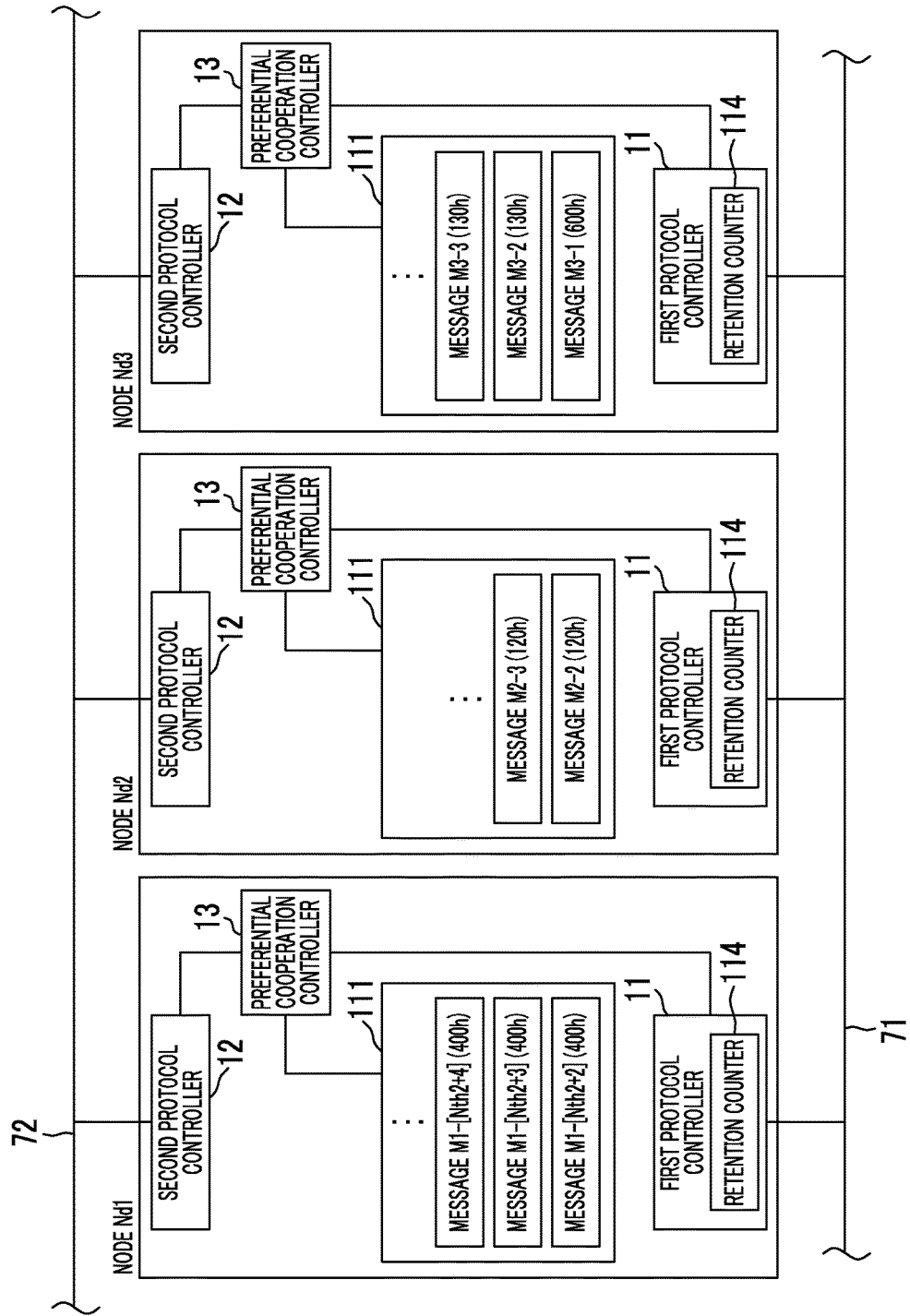
FIG. 7 is an explanatory diagram of the operation example according to the present embodiment.

FIGS. 5 to 7 are explanatory diagrams of operation examples of the present embodiment. In FIGS. 5 to 7, the ECU 20 and the second RAM 112 are not shown. In FIGS. 5 to 7, the stacked states of the messages in the first RAMs 111 are schematically shown, similarly to FIGS. 3 and 4. In the illustrated stacked state, the bottom is the head of the queue, and the first to third (or the first and second) messages are shown in the nodes Nd1 to Nd3 in the present example. Priorities assigned to the messages are depicted in brackets given to the messages. The stacked states of the messages in the first RAMs 111 shown in FIG. 5 are the same as the stacked states shown in FIG. 4.

It is assumed that a first transmission cycle is an initial transmission cycle, and a value of the retention counter 114 of each of the nodes Nd1 to Nd3 is an initial value "0". It is assumed that the predetermined values Nth set to the nodes Nd2 and Nd3 are "Nth2" and "Nth3", respectively. As one example, it is assumed that Nth2<Nth3. It is assumed that a plurality (greater than a number of the predetermined value Nth2) of messages, each having a priority of "$400h$", is consecutively present in the node Nd1.

As shown in FIG. 5, in the first transmission cycle, a message M1-1 among messages M1-1, M2-1, M3-1 at the heads of the nodes Nd1 to Nd3 is in the higher-priority determination state, and the transmission of the message M1-1 to the bus 71 is completed. As a result, the retention counters 114 of the nodes Nd2 and Nd3 increment the counter values by one, and the retention counter 114 of the node Nd1 is cleared.

In a second transmission cycle, a message M1-2 among messages M1-2, M2-1, M3-1 at the heads of the nodes Nd1 to Nd3 is in the higher-priority determination state, and the transmission of the message M1-2 to the bus 71 is completed. As a result, the retention counters 114 of the nodes Nd2 and Nd3 increment the counter values by one, and the retention counter 114 of the node Nd1 is cleared.

In a third transmission cycle, a message M1-3 among messages M1-3, M2-1, M3-1 at the heads of the nodes Nd1 to Nd3 is in the higher-priority determination state, and the transmission of the message M1-3 to the bus 71 is completed. As a result, the retention counters 114 of the nodes Nd2 and Nd3 increment the counter values by one, and the retention counter 114 of the node Nd1 is cleared.

Hereinafter, through the repetition of such processes, the counter values of the retention counters 114 of the nodes Nd2 and Nd3 are increased, and the counter value of the retention counter 114 of the node Nd2 exceeds the predetermined value Nth2. That is, as shown in FIG. 6, in an [Nth2+1]-th transmission cycle, a message M1-[Nth2+1] among messages M1-[Nth2+1], M2-1, M3-1 at the heads of the nodes Nd1 to Nd3 is in the higher-priority determination state, and the transmission of the message M1-[Nth2+1] to the bus 71 is completed. As a result, the retention counters 114 of the nodes Nd2 and Nd3 increment the counter values by one, and the counter value of the retention counter 114 of the node Nd2 is "Nth2+1" which exceeds the predetermined value Nth2.

When the counter value of the retention counter 114 of the node Nd2 exceeds the predetermined value Nth2, the bus change process is performed as stated above. In this case, the retention message M2-1 of the node Nd2 is erased from the first RAM 111, and the retention message M2-1 is written in the second RAM 112. As shown in FIG. 7, since the retention message M2-1 is erased from the first RAM 111 in the node Nd2, the message M2-2 reaches the head of the queue of the first RAM 111.

As shown in FIG. 7, in an [Nth2+2]-th transmission cycle, a message M2-2 among of messages M1-[Nth2+2], M2-2, M3-1 at the heads of the nodes Nd1 to Nd3 is in the higher-priority determination state, and the transmission of the message M2-2 to the bus 71 is completed. In doing so, the retention (the retention due to the fact that the message M2-2 is positioned subsequent to the message M2-1 having a relatively low priority) of the message M2-2 having a high priority in the node Nd2 is resolved. Although not shown, the retention (the retention due to the fact that a message M3-2 is positioned subsequent to the message M3-1 having a relatively low priority) of the message M3-2 having a high priority in the node Nd3 is similarly resolved.

In doing so, according to the present embodiment, since it is possible to shorten a period during which the messages M2-2 and M3-2 having high priorities are retained due to the retention of the messages M2-1 and M3-1 having relatively low priorities, it is possible to reduce the influence of the message having a relatively low priority on the robust operation of the vehicle system.

While the embodiment has been described, the embodiment is not limited to a specific embodiment, and various modifications and changes may be made without departing from the scope described in claims. All or the plurality of components of the embodiment may be combined.

Although it has been described in the above-described embodiment that the second protocol controller 12 does not have the same retention counter as the retention counter 114, the second protocol controller may have the same retention counter as the retention counter 114. In this case, the preferential cooperation controller 13 implements transition of the retention message from any one controller to the other controller between the first protocol controller 11 and the second protocol controller 12. That is, when the value of the retention counter of the second protocol controller 12 exceeds the predetermined value Nth (that is, when the retention message is generated in the second protocol controller 12), the preferential cooperation controller 13 transmits the retention message to the first protocol controller 11 other than the second protocol controller 12. That is, the preferential cooperation controller 13 erases the retention message of the second RAM 112, and writes the retention message in the first RAM 111.

Although it has been described in the above-described embodiment that the nodes Nd1 to Ndn are connected to the two buses 71, 72 in the in-vehicle communication system 100, the number of buses may be three or more. For example, when a third bus is provided in addition to the buses 71, 72, a third protocol controller and a third RAM are provided. In this case, when the value of the retention counter 114 exceeds the predetermined value Nth (that is, when the retention message is generated), the preferential cooperation controller 13 transmits the retention message to one selected from the second protocol controller 12 and the third protocol controller other than the first protocol controller 11. That is, the bus change process selectively includes a process of changing the bus to which the retention message is transmitted from the bus 71 to the bus 72, and a process of changing the bus to which the retention message is transmitted from the bus 71 to the third bus.

Although it has been described in the above-described embodiment that the bus 72 conforms to the same protocol (CAN in the above-described embodiment) as that of the bus 71 in the in-vehicle communication system 100, the bus may conform to another protocol. In this case, the nodes Nd1 to Ndn are connected to the bus 72 through a gateway.

Although it has been described in the above-described embodiment that each of the nodes Nd1 to Ndn has the preferential cooperation controller 13 and the retention counter 114, solely a part (at least one) of the nodes Nd1 to Ndn may include the preferential cooperation controller 13 and the retention counter 114. The above-described advantage can be acquired in the node including the preferential cooperation controller 13 and the retention counter 114.

Although it has been described in the above-described embodiment that the second protocol controller 12 also transmits a message other than the retention message to the bus 72, the embodiment is not limited thereto. For example, the second protocol controller 12 may transmit solely the retention message. That is, the bus 72 may be a dedicated bus for the retention message.

Although it has been described in the above-described embodiment that the first protocol controller 11 performs the process of transmitting the messages to the bus 71 for every predetermined transmission cycle synchronized with the first clock in a state in which the messages are stacked in the first RAM 111, the embodiment is not limited thereto. For example, the first protocol controller 11 may perform the process of transmitting the messages to the bus 71 in cycles corresponding to a random number of first clocks or in cycles corresponding to a predetermined number of regularly changing first clocks in a state in which the messages are stacked in the first RAM 111. The same is true for the second protocol controller 12.

What is claimed is:

1. An in-vehicle communication system, comprising a plurality of nodes each connected to a first bus and a second bus wherein:
the first bus and the second bus each transmits a message with a priority according to the priority; and
each of the plurality of nodes is configured to:
count the number of times that the message is transmitted from an own node to the first bus having lower priority than the message from other node;
determine when the number of times of transmission exceeds a predetermined number of times; and
transmit the message with the priority to the first bus or the second bus according to the determination, wherein
the priorities are assigned to the each messages; and
each of the plurality of nodes is configured to:
transmit a plurality of message to the first bus at every predetermined transmission cycle; and
count the number of times of transmission for every message.

2. The in-vehicle communication system according to claim 1, wherein each of the plurality of nodes is configured to transmit the message to the second bus when the number of times of transmission is determined to exceed the predetermined number of times.

3. The in-vehicle communication system according to claim 1, wherein:
the messages are transmitted to the first bus and the second bus by using a code string of binary data; and
each of the plurality of nodes is configured to:
detect a change in potential of the first bus; and
determine that the message from the other node is prioritized over the message from the at least one node when the change in the potential of the first bus is different from the code string of the message transmitted from the at least one node.

4. The in-vehicle communication system according to claim 1, wherein each of the plurality of nodes is configured to:
determine whether or not a transmission of the message from the at least one node is completed; and
set the number of times the message from the other node is prioritized over the message from the at least one node to be zero when the transmission is completed.

5. The in-vehicle communication system according to claim 1, wherein:
a transmission of a message having a relatively high priority is prioritized over a transmission of a message having a relatively low priority among the nodes in the second bus;
each of the plurality of nodes is configured to:
perform a process of transmitting messages to the second bus by using a plurality of messages having different priorities as targets;
determine whether or not a message from another node which is a node other than the at least one node among the nodes is prioritized over a message from the at least one node in the second bus for every message;
count the number of times the message from the other node is prioritized over the message from the at least one node in the second bus; and
change a bus such that the message is transmitted to the first bus when one message for which the number of times the message from the other node is prioritized over the message from the at least one node exceeds a predetermined value is generated in the second bus.

6. An in-vehicle communication system, comprising a plurality of nodes each connected to a first bus and a second bus wherein:
the first bus and the second bus each transmits a message with a priority according to the priority; and
each of the plurality of nodes is configured to:
count the number of times that the message is transmitted from an own node to the first bus having lower priority than the message from other node;
determine when the number of times of transmission exceeds a predetermined number of times; and
transmit the message with the priority to the first bus or the second bus according to the determination, wherein
each of the plurality of nodes is includes:
a first storage for storing the message transmitted to the first bus; and
a second storage for storing the message transmitted to the second bus; and
each of the plurality of nodes is configured to copy the message stored in the first storage to the second storage and delete the message stored in the first storage according to the determination.

7. The in-vehicle communication system according to claim 6, wherein the first bus and the second bus conform to Controller Area Network.

8. An in-vehicle communication system, comprising a plurality of nodes each connected to a first bus and a second bus wherein:
the first bus and the second bus each transmits a message with a priority according to the priority; and
each of the plurality of nodes is configured to:
count the number of times that the message is transmitted from an own node to the first bus having lower priority than the message from other node;
determine when the number of times of transmission exceeds a predetermined number of times; and
transmit the message with the priority to the first bus or the second bus according to the determination, wherein
in assigning priorities to messages, a message related to vehicle traveling control is assigned a priority higher than a priority of a message related to control for improving convenience and thermal comfort.

* * * * *